United States Patent
Heilman et al.

(10) Patent No.: US 7,524,796 B1
(45) Date of Patent: Apr. 28, 2009

(54) ENVIRONMENTALLY ACCEPTABLE POLYMER SUSPENSIONS FOR OIL FIELD APPLICATIONS

(76) Inventors: William J. Heilman, 14826 LaQuinta La., Houston, TX (US) 77079; Asoke K. Deysarkar, 621 White Wing La., Houston, TX (US) 77079

( * ) Notice: Subject to any disclaimer, the term of this patent is extended or adjusted under 35 U.S.C. 154(b) by 0 days.

(21) Appl. No.: 12/074,139

(22) Filed: Feb. 27, 2008

(51) Int. Cl.
*C09K 8/60* (2006.01)
*C09K 8/588* (2006.01)
(52) U.S. Cl. ............ 507/213; 507/215; 507/225; 507/266; 507/910
(58) Field of Classification Search ........... 507/203, 507/213, 215, 212, 214, 224, 225, 229, 266, 507/910
See application file for complete search history.

(56) References Cited

U.S. PATENT DOCUMENTS

| | | | | |
|---|---|---|---|---|
| 4,120,800 | A * | 10/1978 | Valcho et al. | 507/244 |
| 4,162,143 | A * | 7/1979 | Yount, III | 44/281 |
| 5,969,012 | A | 10/1999 | Harris, Jr. | |
| 6,451,743 | B1 | 9/2002 | Fox | |
| 6,620,769 | B1 | 9/2003 | Juppe et al. | |
| 6,667,354 | B1 | 12/2003 | Fox et al. | |
| 6,743,756 | B2 | 6/2004 | Harris, Jr. | |
| 6,800,593 | B2 | 10/2004 | Dobson, Jr. et al. | |
| 6,818,597 | B2 | 11/2004 | Harris | |
| 2003/0236173 | A1 * | 12/2003 | Dobson et al. | 507/110 |
| 2006/0116296 | A1 * | 6/2006 | Kippie et al. | 507/244 |

* cited by examiner

*Primary Examiner*—Timothy J Kugel

(57) ABSTRACT

Polymer suspensions prepared with non-aqueous, oil-free carrier fluids, for use in oil or gas well servicing. The polymer suspensions typically comprise a hydrophilic polymer, an organic clay, a stabilizer, and a carrier fluid selected from propylene glycol and butylene glycol. The addition of isopropyl alcohol, a polar activator, lowers the viscosity of the suspension. The further addition of neopentyl glycol further lowers viscosity and improves cross-linking of the polymer. The composition is both stable and environmentally acceptable.

9 Claims, No Drawings

ENVIRONMENTALLY ACCEPTABLE POLYMER SUSPENSIONS FOR OIL FIELD APPLICATIONS

FIELD OF THE INVENTION

The present invention relates to stable non-aqueous, oil-free carrier fluids for polymer suspensions used in oil or gas well servicing fluids. More specifically, the present invention relates to stable polymer suspensions prepared using certain propanediols and butanediols as carrier fluids, with isopropyl alcohol and/or neopentyl glycol as optional additives.

BACKGROUND OF THE INVENTION

Thickened aqueous fluids, such as drilling fluids, are widely used in oil field operations for fracturing and for well servicing, such as drilling, workover and completion. The aqueous fluids typically have high viscosities and are able to minimize solvent loss. They often contain a hydrophilic polymer dissolved in a solvent, such as water. The water-soluble polymers most often used are polysaccharides, guar and guar derivatives, cellulosics and cellulosic derivatives, xanthan gum, modified starches, polyvinylsaccharides, and similar biopolymers. The hydrophilic polymers act to thicken the fluids; crosslinking agents and additives such as surfactants may also be used. The polymer can be offered as a powder or as a suspension in a carrier fluid such as No. 2 diesel oil. Polymers in powder form must first be dispersed so that individual particles can absorb water in order to prevent the formation of lumps. As a result, polymers in suspensions have been developed for delivery to work sites, and they are usually preferred over polymers in powder form. Such suspensions tend to disperse well when added to water.

The carrier fluid used to suspend the polymer is an important choice. A typical concentrated suspension uses guar or guar derivatives dispersed in a hydrophobic solvent, such as No. 2 diesel, in combination with a suspension agent and a surfactant, such as that described in U.S. Pat. No. 6,800,593 to Dobson, Jr. et al. However, such oil-based drilling fluids are not biodegradable and have fallen into disfavor due to environmental concerns.

Recent patents that describe alternative carrier fluids include U.S. Pat. No. 6,620,769 to Juppe et al., which uses white mineral oil as the carrier fluid; U.S. Pat. No. 6,667,354 to Fox et al., which uses carboxylic acid ester as the carrier fluid; and U.S. Pat. No. 7,199,084 to Parris, which uses a "biodiesel" (any of the mono alkyl esters of long chain fatty acids) or a "mutual solvent" (such as ethylene glycol monobutyl ether and hexylene glycol).

The choice of a carrier fluid involves a variety of issues, including cost of the chemicals, toxicity, viscosity of the suspension, cross-linking considerations, and, most importantly, the stability of the suspension. Ideally, a carrier fluid will aid in the production of a polymer suspension that is water soluble, environmentally acceptable, cost effective, low in effective viscosity, and stable for long periods of time to allow for storage and transportation of the suspension to the field.

SUMMARY OF THE INVENTION

The present invention provides a stable, non-aqueous, oil-free polymer suspension which uses either propylene glycol (3 carbons, either 1,2-propanediol or 1,3-propanediol) or butylene glycol (4 carbons, particularly 1,2-butanediol) as the carrier fluid. The preferred percentage of carrier fluid by weight ranges from 45 to 80 percent, and the preferred percentage of hydrophilic polymer by weight ranges from 20 to 45 percent. Isopropyl alcohol (2-propanol) can be added as an activator. The further addition of neopentyl glycol (2,2-dimethyl-1,3-propanediol), in an amount ranging from 1% to 5% of the suspension, by weight, helps lower viscosity and improves cross linking. The water soluble suspensions described herein are economical, environmentally acceptable, operative over a wide temperature range (from approximately 40° to 120°), and stable for long periods of time. The suspensions of the present invention are suitable for a variety of uses, but are particularly suitable for use in producing oil and gas well treatment fluids.

DESCRIPTION OF THE PREFERRED EMBODIMENTS

The composition of the present invention comprises a hydrophilic polymer, an organic clay, and a surfactant, suspended in a carrier fluid selected from propylene glycol and butylene glycol. Other additives can improve performance.

The hydrophilic polymer used can be any one of a number of water-soluble polymers, including guar and guar derivatives such as hydroxypropyl guar (HPG), carboxymethyl guar (CMG), carboxymethyl hydroxypropyl guar (CMHPG); other cellulosics and cellulosic derivatives such as hydroxyethylcellulose and hydroxpropylcellulose; xanthan gum; polyvinyl pyrrolidone; starch such as carboxymethyl starch; polyacrylamide; and polyacrylate. A good example of such a hydrophilic polymer is a fast-hydrating high yield guar such as Guar GW3, available from Hindustan Gum and Chemical Company.

The organic clay used should be one which is highly dispersible, preferably a nanoclay, which has molecules which will remain suspended in the carrier fluid. Tested successfully were Clorisite Clay 93A and CLAYTONES such as CLAYTONE EM and CLAYTONE 151, both alkyl quaternary ammonium bentonite, which are available from Southern Clay Products, Gonzales, Tex.

A surfactant, or stabilizing agent can be added. Examples of suitable surfactants are TERGITOL XD, an alkyl ethyleneoxide-propyleneoxide copolymer (hereinafter "TERGITOL XD"), PLURONIC 127, and PLURONIC 87, both alkyl ethyleneoxide-propyleneoxide block copolymers (hereinafter "PLURONIC 127" or "PLURONIC 87"). The suspension agent is typically present in the concentrate in an amount from approximately 1% to 3% by weight of the polymer being suspended.

The carrier fluid or solvent of the present invention is propylene glycol (3 carbons, either 1,2 Propanediol or 1,3 Propanediol) or butylene glycol (4 carbons, particularly 1,2, Butanediol, although 1,3-Butanediol and 1,4-Butanediol can be used). The organic clay chosen performs well in these carrier fluids because there is a one to one molecular interaction that imparts proper suspension and viscosity. Further, these carrier fluids are readily biodegradable when exposed to the environment.

A polar activator can be added in order to help overcome the inherent associative forces holding together the clay molecules in order to disperse them in the carrier fluid. The activator used successfully herein is 0.1% to 10.0% isopropyl alcohol (2-propanol).

Optionally, neopentyl glycol, a solid, can be added to the suspension. Neopentyl glycol is not soluble in organic solvents, such as diesel, Envirodrill, or ODC Sassol (paraffinic, naphthene base oil), but is soluble in propylene glycol. The addition of neopentyl glycol (2,2-dimethyl-1,3-propanediol)

lowers viscosity and improves cross-linking of the guar molecules. The goal is to lower the effective viscosity, but have it remain high enough to ensure a stable slurry. The addition of the neopentyl glycol ties up the hydroxyl groups, pulling the guar molecules together and reducing the molecular volume of the suspension. In the following examples, slurry compositions were prepared by mixing the listed ingredients in the amounts listed. The resulting slurries were observed over time. A "good," or stable, slurry was one in which the guar remained in suspension for at least 24 hours, with minimal or no settling. A "bad" or unacceptable slurry was one showing significant separation or settling of the guar.

EXAMPLE 1

| Ingredients | Weight (grams) | Percentage (%) |
|---|---|---|
| 1,2-Propanediol | 182.0 | 65.0 |
| PLURONIC 127 | 1.5 | 0.5 |
| Clorisite Clay 93A | 3.0 | 1.1 |
| Guar GW-3 | 93.5 | 33.4 |

1. In a Waring blender, mix PLURONIC 127 and 1,2-Propanediol for 5 minutes at maximum speed.
2. Add Clorisite Clay 93A and mix for 5 minutes at maximum speed.
3. Cool in water bath to room temperature.
4. Add Guar GW-3 and mix for 5 minutes at maximum speed.
5. Pour 100 ml. into 100 ml. graduated cylinder and remaining slurry into 500 ml. jar.

Result: Separation in the graduated cylinder:
  5 ml. after 1 week; 2 ml. after 1 month; 2 ml. after 2 months. Guar remained in good suspension in the slurry in the jar.

Variations of Example 1:

A. Reduced surfactant to 1 gram PLURONIC 127.

Result: Good slurry. Determined 1 gram is the minimum for this surfactant.

B. Substituted CLAYTONE 151 for Clorisite Clay 93A.

Result: Good slurry.

C. Substituted CLAYTONE EM for Clorisite 93A.

Result: Good slurry, but not as good as Clorisite 93A.

D. Substituted Bentone 155 for Clorisite 93A.

Result: Unacceptable (10 ml. separation).

E. Others: Substituting any of 1-Decanol, ethanol, ethylene glycol, and polyethylene glycol for the 1-2-Propanediol all resulted in inacceptable amounts of separation. Substituting glycerol resulted in solidification of the slurry.

EXAMPLE 2

| Ingredients | Weight (grams) | Percentage (%) |
|---|---|---|
| 1,3-Propanediol | 182.0 | 65.0 |
| PLURONIC 127 | 1.5 | 0.5 |
| Clorisite Clay 93A | 3.0 | 1.1 |
| Guar GW-3 | 93.5 | 33.4 |

1. In a Waring blender, mix PLURONIC 127 and 1,3-Propanediol for 5 minutes at maximum speed.
2. Add Clorisite Clay 93A and mix for 5 minutes at maximum speed.
3. Cool in water bath to room temperature.
4. Add Guar GW-3 and mix for 5 minutes at maximum speed.
5. Pour 100 ml. into 100 ml graduated cylinder and remaining slurry into 500 ml. jar.

Results: Separation in 100 ml. graduated cylinder: None. Guar remained in good suspension in the slurry in the jar.

Variations of Example 2

A. Substituted TERGITOL XM for Clorisite Clay 93.

Result: Good; no separation in 100 ml. graduated cylinder; good suspension in the jar.

EXAMPLE 3

| Ingredients | Weight (grams) | Percentage (%) |
|---|---|---|
| 1,3-propanediol | 182.0 | 62.9 |
| 2-propanol | 18.5 | 6.4 |
| PLURONIC 127 | 1.5 | 0.5 |
| Clorisite Clay 93A | 3.0 | 1.0 |
| Guar GW-3 | 93.5 | 32.3 |

1. In a Waring blender, mix 2-propanol, 1,3-propanediol, and PLURONIC 127 for 5 minutes at maximum speed. Temp. 118° F. PLURONIC completely dissolved.
2. Add Clorisite Clay 93A and mix for 5 minutes at maximum speed. Temp. 120° F.
3. Cool in water bath to room temperature.
4. Add Guar GW-3 and mix for 5 minutes at maximum speed. Temp. 140° F.
5. Pour 100 ml. into 100 ml graduated cylinder and remaining slurry into 500 ml. jar.

Result: Separation in graduated cylinder: None after one month; none after 2¼ months.

Variations of Example 3:

A. Increase amount of 2-propanol to 50.0 g.

Result: Good stable slurry.

B. Substitute 1.5 g. PLURONIC L-35 (HLB-19) for PLURONIC 127.

Result: Poor large separation.

EXAMPLE 4

| Ingredients | Weight (grams) | Percentage (%) |
|---|---|---|
| 1,2-propanediol | 182.0 | 64.2 |
| 2-Propanol | 2.0 | 0.7 |
| PLURONIC 127 | 3.0 | 1.1 |
| Clorisite Clay 93A | 3.0 | 1.1 |
| Guar GW-3 | 93.5 | 33.0 |

1. In a Waring blender, mix 2-propanol, 1,2-Propanediol, and PLURONIC 127 for 5 minutes at maximum speed.
2. Add Clorisite Clay 93A and mix for 5 minutes at maximum speed.

3. Cool in water bath to room temperature.
4. Add Guar GW-3 and mix for 5 minutes at maximum speed.
5. Pour 100 ml. into 100 ml. graduated cylinder and remaining slurry into 500 ml. jar.

Result: Good. 1 ml. separation in 100 ml. graduated cylinder after one month.
   Good Slurry Variations of Example 4:

A. Substitute 3.0 g. TERGITOL XD (solid) for PLURONIC 127.

Result: Good slurry; 1 ml. separation after one month.

B. Substitute 3.0 g. PLURONIC 87 for PLURONIC 127

Result: Good slurry; 1 ml. separation after one month.

C. Substitute 2.0 g. PLURONIC 87 for PLURONIC 127

Result: Dispersion not as stable as in original Example 4.

D. Reduce amount of Clorisite Clay 93A to 2.0 g.

Result: Marginal

E. Reduce amount of PLURONIC 127 to 1.5 g.

Result: Unacceptable

F. Increase Guar GW-3 to 104 g.

Result: Good. No separation in 100 ml. graduated cylinder after 1 month.

EXAMPLE 5

| Ingredients | Weight (grams) | Percentage (%) |
| --- | --- | --- |
| 1,2-Butanediol | 182.0 | 64.2 |
| 2-Propanol | 2.0 | 0.7 |
| PLURONIC 127 | 3.0 | 1.0 |
| Clorisite 93A | 3.0 | 1.0 |
| Guar GW-3 | 93.5 | 33.0 |

1. In a Waring blender, mix 2-Propanol, 1,2-Butanediol, and PLURONIC 127 for 5 minutes at maximum speed.
2. Add Clorisite Clay 93A and mix for 5 minutes at maximum speed.
3. Cool in water bath to room temperature.
4. Add Guar GW-3 and mix for 5 minutes at maximum speed.
5. Pour 100 ml. into 100 ml. graduated cylinder and remaining slurry into 500 ml. jar.

Result: 20 ml. separation in 100 ml. graduated cylinder.
   Good slurry in jar after 1 week, easy to disperse.

Variation of Example 5:

A. Substitute 1,3-Butanediol for 1,2-Butanediol

Result: Good slurry in jar after 2 weeks, easy to dispense.

B. Substitute 1,4-Butanediol for 1,2-Butanediol

Result: Good slurry in jar after 1 month, easy to dispense.

EXAMPLE 6

| Ingredients | Weight (grams) | Percentage (%) |
| --- | --- | --- |
| 1,2-Propanediol | 172.0 | 58.8 |
| 2-Propanedol | 2.0 | 0.7 |
| Neopentyl glycol | 10.0 | 3.4 |
| PLURONIC 127 | 1.5 | 0.5 |
| Clorisite Clay 93A | 3.0 | 1.0 |
| Guar GW-3 | 104.0 | 35.6 |

1. Weigh 1,2-Propanediol, 2-Propanol, and Neopentyglycol into 500 ml. glass jar and use magnetic stirrer, at room temperature, to dissolve the neopentyl glycol. One hour.
2. Add PLURONIC 127. Raise temperature to 118° F. and continue stirring until dissolved.
3. Place composition in Waring blender and add Chorisite Clay 93A. Mix at maximum speed for 5 minutes.
4. Cool to room temperature.
5. Add Guar GW-3 and mix in Waring blender for 5 minutes.
6. Pour 100 ml. into a 100 ml. graduated cylinder and rest into a 500 ml. jar.

Results: Good. Only a little separation after one week.

Variation of Example 6:
   A. Substitute 10 g. Pentaerythritol (2,2-bis(hydroxymethyl-1,3-propanediol) for neopentyl glycol.

Result: No separation in 100 ml. graduated cylinder after one week. However, not only did pentaerythritol not reduce the viscosity (compared to Example 1), it actually raised the viscosity. This result is particularly surprising since both compounds have similar molecular structures.

Performance tests were conducted using the carrier fluid of the present invention. Hydration tests were run for 60 minutes using a Frann 35 viscometer to measure viscosities. The hydration viscosity of a 40 lb. system of a high yield quar in dry powder form was compared to that of a high yield guar using 1,2-propanediol as the carrier. The results are shown in Table 1.

TABLE 1

Hydration Viscosity of Guar Slurry—40 lb System

| Time (Minutes) | High Yield Guar Dry Powder (cP) | High Yield Guar 1,2-propanediol (cP) |
| --- | --- | --- |
| 2.5 | 35.2 | 34.4 |
| 3 | 36 | 36 |
| 4 | 37.6 | 37.6 |
| 5 | 38.8 | 38.6 |
| 10 | 41.4 | 42 |
| 30 | 43.2 | 44.2 |
| 60 | 44.2 | 45.2 |

The hydration test shows that the carrier fluid used herein does not have any detrimental effects on overall performance of the guar; the hydration viscosity values using 1,2-propanediol as the carrier were essentially the same as the normal guar hydration values, for time elapsed.

A cross-linking test was performed, measuring the cross-linking viscosity of the normal high yield guar slurry cross-linked with standard borate, and measuring the cross-linking viscosity of the high yield guar slurry with 1,2-propanediol as the carrier cross-linked with standard borate. The results are shown in Table 2.

TABLE 2

Cross-Link Tests of Guar Slurry with Borate cross-linker at High pH

| Time (Minutes) | High Yield Guar Normal Slurry (cP) | High Yield Guar 1,2-propanediol (cP) |
|---|---|---|
| 0 | 983 | 55 |
| 30 | 326 | 421 |
| 62 | 476 | 504 |
| 92 | 544 | 528 |
| 125 | 462 | 538 |
| 156 | 415 | 562 |
| 193 | 365 | 452 |

The results show that using 1,2-propanediol as the carrier fluid has no adverse effect on the cross-linking viscosity of the fluid. In fact, in the limited tests performed, the cross-link viscosity values were actually higher when 1,2-propanediol was the carrier fluid.

Generally speaking, the use of propanediol and butanediol as the carrier fluid for a high yield guar decease its viscosity. The addition of isopropyl alcohol lowers viscosity even more. As a result, it is desirable to use isopropyl alcohol as an activator. The addition of neopentyl glycol has been shown to dramatically reduce viscosity. As a result, the amount of guar in the suspension can be increased (raising the viscosity) without significantly compromising the performance of the suspension.

Finally, after due experimentation, it has been determined that a satisfactory suspension does not result from the use of monomeric glycol, such as ethylene glycol, as the carrier fluid.

We claim:

1. A nonaqueous fluid polymer suspension composition for use in oil or gas well servicing fluids comprising:
   (a) a hydrophilic polymer;
   (b) an organic clay;
   (c) a stabilizer that is a surfactant; and
   (d) a water-soluble carrier fluid selected from propylene glycol and butylene glycol, the carrier fluid present in an amount ranging from 45 to 80 weight percent.

2. The composition of claim 1 which further comprises 0.1 to 10.0% isopropyl alcohol.

3. The composition of claim 2 which further comprises neopentyl glycol.

4. The composition of claim 1 wherein the hydrophilic polymer is selected from the group consisting of guar, guar derivatives, cellulosics, cellulosic derivatives, xanthan gum, polyvinylpyrrolidones, starches, carboxymethyl starch, a polyacrylamides, and polyacrylates.

5. The composition of claim 1 wherein the organic clay is a nanoclay.

6. The composition of claim 1 wherein the surfactant is selected from an alkyl ethyleneoxide-propyleneoxide copolymer and an alkyl ethyleneoxide-propyleneoxide block coploymer.

7. The composition of claim 1 wherein the hydrophilic polymer is present in an amount ranging from 20 to 45 weight percent.

8. The composition of claim 1 wherein the organic clay is present in an amount ranging from 0.9 to 5.0 weight percent.

9. The composition of claim 1 wherein the surfactant is present in an amount ranging from 0.5 to 5.0 weight percent of the hydrophilic polymer.

* * * * *